US011865506B2

United States Patent
Zhang et al.

(10) Patent No.: US 11,865,506 B2
(45) Date of Patent: Jan. 9, 2024

(54) PYRACLOSTROBIN MICROCAPSULE BASED ON SODIUM ALGINATE AND PREPARATION METHOD

(71) Applicants: ANHUI AGRICULTURAL UNIVERSITY, Hefei (CN); Plant Protection And Agro-Products Safety, Anhui Academy Of Agricultural Sciences, Hefei (CN)

(72) Inventors: Chengqi Zhang, Hefei (CN); Mengqiu Wang, Hefei (CN); Yu Chi, Hefei (CN); Li Chen, Hefei (CN); Xianyan Su, Hefei (CN); Xuexiang Ren, Hefei (CN); Zhenghe Ye, Hefei (CN)

(73) Assignees: ANHUI AGRICULTURAL UNIVERSITY, Hefei (CN); PLANT PROTECTION AND AGRO-PRODUCTS SAFETY, ANHUI ACADEMY OF AGRICULTURAL SCIENCES, Hefei (CN)

( * ) Notice: Subject to any disclaimer, the term of this patent is extended or adjusted under 35 U.S.C. 154(b) by 0 days.

(21) Appl. No.: 18/131,871

(22) Filed: Apr. 7, 2023

(65) Prior Publication Data
US 2023/0330614 A1     Oct. 19, 2023

(30) Foreign Application Priority Data
Apr. 19, 2022   (CN) .......................... 202210407730.8

(51) Int. Cl.
    *B01J 13/14*       (2006.01)
    *A01N 25/28*     (2006.01)
    *A01N 43/56*     (2006.01)

(52) U.S. Cl.
    CPC .............. *B01J 13/14* (2013.01); *A01N 25/28* (2013.01); *A01N 43/56* (2013.01)

(58) Field of Classification Search
    CPC ........... B01J 13/14; A01N 25/28; A01N 43/56
    See application file for complete search history.

(56) References Cited

U.S. PATENT DOCUMENTS

| | | | | |
|---|---|---|---|---|
| 2014/0302135 A1* | 10/2014 | Durvasula | .............. | A01N 25/26 424/463 |
| 2015/0237860 A1* | 8/2015 | Anderson | .............. | A01N 43/88 514/3.3 |
| 2016/0007613 A1* | 1/2016 | Brown | .................. | A01N 63/30 504/117 |

FOREIGN PATENT DOCUMENTS

CN         106070274 A      11/2016

OTHER PUBLICATIONS

Sigma Aldrich—Millipore Sigma. "9004-96-0." Retrieved online on Aug. 3, 2023. Retrieved from <URL: https://www.sigmaaldrich.com/US/en/search/9004-96-0?focus=products&page=1&perpage=30&sort=relevance&term=9004-96-0&type=cas_number>. (Year: 2023).*

Wang Chunyan et al.: "Preparation methods of calcium alginate microcapsules and their application in pesticide sustained release", Pesticides, p. 724-726, English Abstract only.

* cited by examiner

*Primary Examiner* — Doan T Phan

(57) ABSTRACT

The present disclosure provides a pyraclostrobin microcapsule based on sodium alginate, which is prepared by mixing pyraclostrobin original drug dissolved in ethyl acetate, 1% aqueous sodium alginate solution, and 5% aqueous calcium carbonate solution at 25° C., and mixing the mixed solution with liquid paraffin containing 10% emulsifier A-110, maintaining a shear rate of 1000 r/min to emulsify for 10 min; using 87.5 mmol/L glacial acetic acid to reduce the pH of the mixed phase, such that the cross-linking reaction between ions can be formed into microcapsules; finally using pH 4.5 acetate buffer to wash and separate the microcapsule slurry, and then centrifuging and freeze-drying to prepare the pyraclostrobin SA microcapsules. The microcapsules prepared by the present disclosure have excellent formulation performance and can be used for the control of Fusarium pseudograminearum.

1 Claim, 11 Drawing Sheets

Drawings

PYRACLOSTROBIN MICROCAPSULE BASED ON SODIUM ALGINATE AND PREPARATION METHOD

CROSS REFERENCE TO RELATED APPLICATIONS

The present application claims the priority of Chinese patent application No. 202210407730.8, filed on Apr. 19, 2022, and the contents of which are hereby incorporated in its entirety.

TECHNICAL FIELD

The present disclosure relates to the field of pesticide preparations, and in particular to a pyraclostrobin microcapsule based on sodium alginate and a preparation method.

BACKGROUND

Microcapsule is one of pesticide slow-release formulations, referred to a film-forming material that acts as a carrier to encapsulate active ingredients or other active substances of drugs, forming a capsule-type encapsulation that can reduce or control the rate of release of internal substances. The process of preparing microcapsules is known as microencapsulation technology. Microcapsules can encapsulate not only solid substances, but also liquids, gases, and substances in other states. In practice, microcapsules with particle size between 2-1000 μm are often used for processing into various pesticide dosage forms. The commonly used materials for preparing microcapsule walls include natural polymer materials, inorganic materials, synthetic and semi-synthetic materials.

Sodium alginate is a natural polysaccharide carbon-water macromolecular compound extracted from brown algae, which belongs to plant gum category. It has the characteristics of good stability, thickening and biocompatibility. It has been widely used in food and pharmaceutical processing fields and has a high use value. As early as 1938, it has been included in the pharmacopoeia of the United States and is often used to make drug carriers such as retarders, encapsulants, and bioadhesives. Sodium alginate is widely sourced and can be extracted from cell walls of brown algae organisms and some bacteria. The methods to prepare microcapsules using sodium alginate as wall material include spray drying method, extrusion method, emulsification gel method, layer assembly method, etc. The prepared sodium alginate microcapsules have the following characteristics: (1) high microcapsule strength and uniform particle size distribution, which can well protect the drug active ingredients inside the microcapsules; (2) anti-surge release and pH sensitivity, such that the microcapsules almost do not swell and the internal active ingredient release rate is low in the acidic environment, while the microcapsule swelling increases and the internal drug release rate is relatively faster in the alkaline environment. (3) the raw material of sodium alginate is safe and non-toxic, and the prepared microcapsules can well encapsulate the drug components, which increases the biosafety of the drug.

Pyraclostrobin is a mitochondrial respiration inhibitor. Its mechanism of action is to block the electron transfer process within the mitochondria, making the mitochondria unable to provide the energy required to meet the normal metabolism of the cells, and eventually the normal cells die of exhaustion as a result. The compound has a wide fungicidal spectrum, strong relative inhibition activity, strong conduction activity, low pesticide residues after use, protection of the host, regulation of crop growth, promote plant growth and other characteristics. Pyraclostrobin has a strong ability to inhibit the germination of plant pathogenic spores, and its conduction endosorption activity in plants is high, especially for the inhibition of the pathogenic mycelium inside the plant leaves, but the conduction endosorption activity in the leaf tip and basal part of the plant leaves is low.

Although pyraclostrobin has a wide spectrum of control and strong systemic absorption, it is very toxic to aquatic organisms and is once restricted to be used for the control of rice related diseases. It is not until BASF developed a microencapsulated suspension of pyraclostrobin for rice blast control that it began to be used in rice disease control. Under natural conditions, pyraclostrobin is easily photolyzed, resulting in low effective utilization in the field and short duration of efficacy after application. The common formulations of pyraclostrobin include emulsifiable oil, water dispersible granules, and water emulsion, etc. However, the use of large amount of organic solvent in the process of emulsifiable oil formulation will cause environmental pollution and iste of resources. According to the nature of pyraclostrobin, it can be made into powder, wettable powder, suspension, and microcapsule, etc. Among them, microcapsule and microcapsule suspension have become the hot spot of pyraclostrobin in recent years.

In this study, pyraclostrobin SA (sodium alginate) microcapsules are prepared by endogenous emulsification gelation method with sodium alginate as the capsule wall and pyraclostrobin as the core, and then the influence of different process parameters on the size and distribution of microcapsules is investigated by optimizing the influencing factors and process conditions during the preparation of microcapsules. By a series of performance characterization measurements on the prepared microcapsules, the appearance, particle size and distribution, encapsulation rate, release performance, and stability of the microcapsules are investigated and analyzed. Using pyraclostrobin original drug as a control, indoor bioactivity of the microcapsules with the optimal ratio is measured to analyze the growth inhibition effect of the microcapsules on the mycelium of the pathogen, for obtaining stable, safe, and environmentally friendly microcapsules of pyraclostrobin, providing the possibility of increasing the variety of pyraclostrobin related dosage forms, and providing new ideas and technical support for the research and development of new slow-release pesticide dosage forms for pyraclostrobin to better achieve the purpose of reducing application and increasing efficiency in agricultural fields.

SUMMARY OF THE DISCLOSURE

In the present disclosure, a pyraclostrobin microcapsule based on sodium alginate is prepared by mixing pyraclostrobin original drug dissolved in ethyl acetate, 1% aqueous sodium alginate solution, and 5% aqueous calcium carbonate solution at 25° C., and mixing the mixed solution with liquid paraffin containing 10% emulsifier A-110, maintaining a shear rate of 1000 r/min to emulsify for 10 min; using 87.5 mmol/L glacial acetic acid to reduce the pH of the mixed phase, such that the cross-linking reaction between ions can be formed into microcapsules; finally using pH 4.5 acetate buffer to wash and separate the microcapsule slurry, and then centrifuging and freeze-drying to prepare the pyraclostrobin SA microcapsules. The microcapsules prepared by the present disclosure have excellent formulation performance and can be used for the control of Fusarium pseudograminearum.

Compared with the related art, the present disclosure has the following beneficial effects:

In this study, sodium alginate is used as the capsule wall, pyraclostrobin is used as the capsule core, and pyraclostrobin SA microcapsules are prepared by endogenous emulsification gel method.

The effects of different solvent types and different sodium alginate additions, emulsification time, shear rate, emulsifier types and additions, and other drug loading conditions on the particle size and distribution of the prepared microcapsules are compared. Combining the solubility of the original drug, ethyl acetate is selected as the capsule core solvent, and 1% sodium alginate and 10% emulsifier A-110 are used to emulsify at a shear rate of 1000 r/min for 10 min at 25° C. The particle size of pyraclostrobin SA microcapsules is small and uniform, and the particle size is normally distributed.

The morphological characterization and encapsulation efficiency of the pyraclostrobin SA microcapsules are measured, and the results show that the microcapsules are in a good state of encapsulation, spherical in shape, smooth and rounded in surface, good in dispersibility, and free of adhesion.

The study compares the cold and hot storage stability of the pyraclostrobin SA microcapsules and the original drug, and finds that the two have better stability when stored at 4° C. and −20° C.; however, the decomposition rate of the original drug is faster when stored at 25° C. and high temperature 54° C., where the decomposition rates of the original drug and microcapsules are 40.25% and 16.44%, respectively, after 30 days storage at 54° C., indicating that microencapsulation of the original drug can well delay and reduce the damage caused by high temperature to its active ingredients.

The photostability test results of the pyraclostrobin SA microcapsules and the original drug show that the half-lives of the original drug and the microcapsules are 21.04 min and 43.42 min, respectively, indicating that microencapsulation can well extend the half-life of the active ingredient of pyraclostrobin. It indicates that microencapsulation can reduce the photolysis rate and photolysis degree of pyraclostrobin, enhance the stability of the agent, and can achieve the effect of protecting the original drug of the capsule core.

The release test of the pyraclostrobin SA microcapsules in different pH release media shows that the microcapsules have a well controlled release effect.

As a result of the toxicity test, it is found that the $EC_{50}$ value of the original drug is 0.097 μg/mL, and the maximum inhibition effect on mycelium growth is achieved when the microcapsules are treated for 12 days, when its $EC_{50}$ value is 0.1109 μg/mL, indicating that the microencapsulation of pyraclostrobin has a good slow-release effect.

BRIEF DESCRIPTION OF THE DRAWINGS

FIG. 14: Comparison of photodegradation efficiency of original drug and microcapsules by ultraviolet light.
FIG. 15: Release curves of pyraclostrobin SA microcapsules in PBS buffers of different pH.

DETAILED DESCRIPTION

Figure 1:
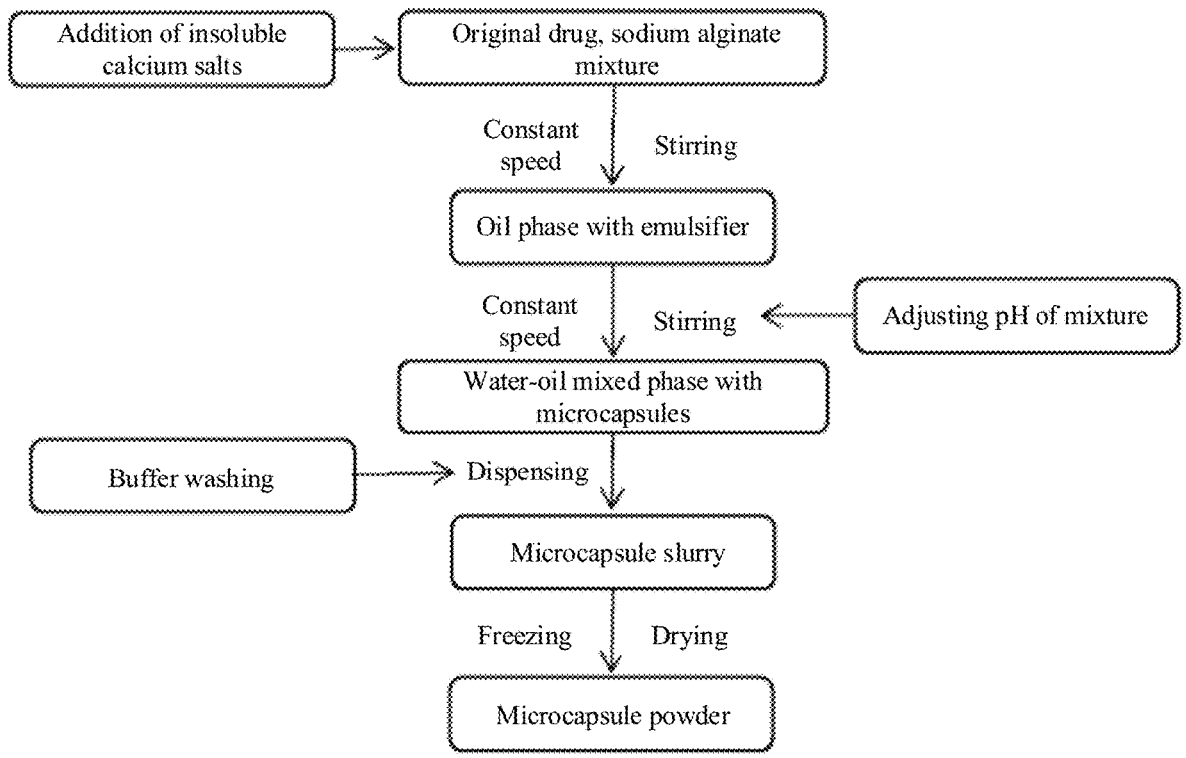
FIG. 1: Preparation flow chart.
Figure 2A:
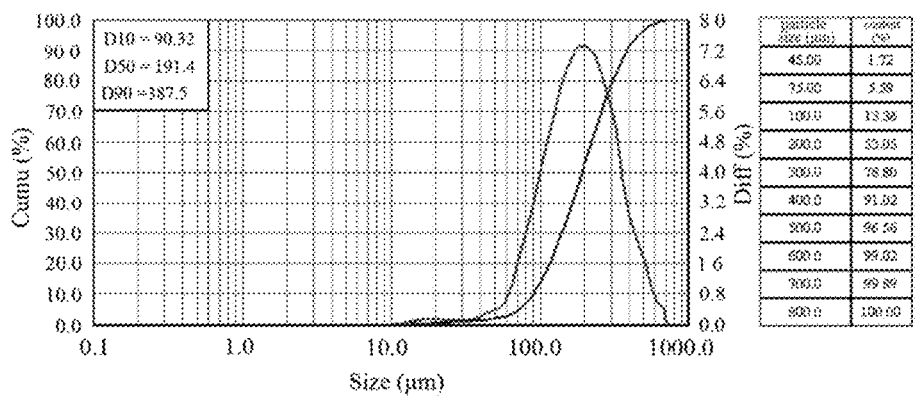
FIG. 2A: Effects of ethanol on the particle size of microcapsules.
Figure 2B:
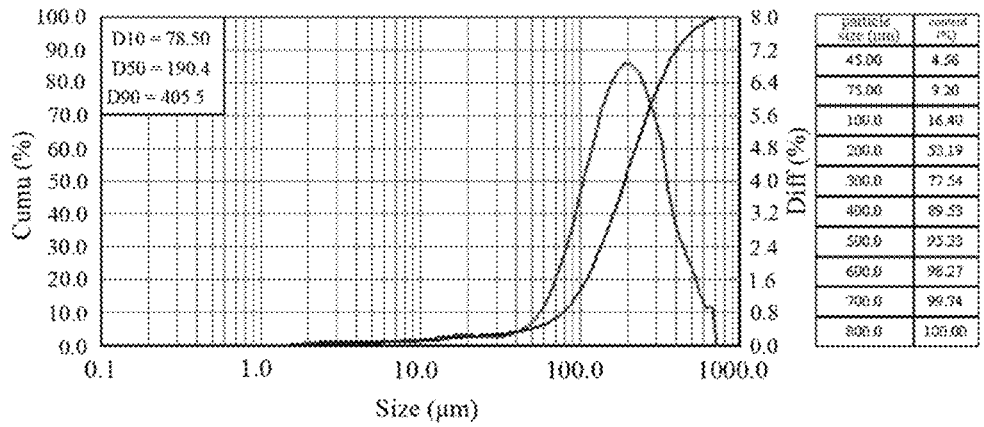
FIG. 2B: Effects of methanol on the particle size of microcapsules.
Figure 2C:
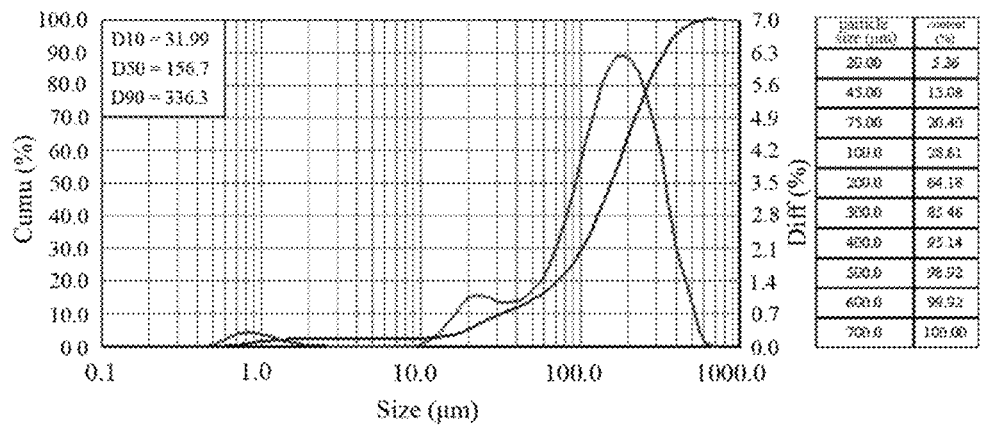
FIG. 2C: Effects of acetone on the particle size of microcapsules.
Figure 2D:
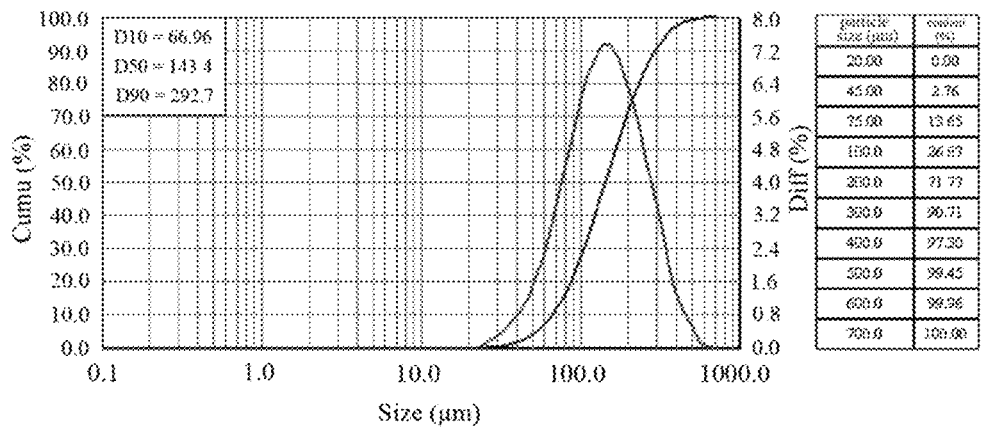
FIG. 2D: Effects of ethyl acetate on the particle size of microcapsules.

The present disclosure can be better understood from the following examples. However, those skilled in the art can easily understand that the content described in the embodiments is only for illustrating the present disclosure and should not and will not limit the present disclosure described in detail.

Embodiment 1: Development of pyraclostrobin microcapsules 1.1 Materials and methods The chemical reagents and instruments used in this experiment are provided by Laboratory of Plant Disease Epidemiology and Integrated Management, College of Plant Protection Anhui Agricultural University and Institute of Plant Protection and Agro-Products Safety, Anhui Academy of Agricultural Sciences.

1.2 Preparation method of microcapsules

Preparation of pyraclostrobin SA microcapsules by endogenous emulsification gel method (room temperature 25° C.)

a. Accurately weigh 0.5 g of pyraclostrobin original drug into a beaker, add 0.75 mL ethyl acetate to the beaker, place on a magnetic stirrer and stir until the original drug is completely dissolved.

b. Add 0.1 mL emulsifier A-110 and 1 mL ddH$_2$O dropwise into the beaker, keep the stirring speed of 400 r/min, and emulsify evenly for 15 min.

c. Measure 100 mL ddH$_2$O in a beaker, heat it to 60° C., and add 1.0 g of sodium alginate into the beaker, place the beaker on a constant temperature water bath, keep stirring at a constant temperature of 60° C. until the sodium alginate is completely dissolved, use ultrasonic cleaning machine to ultrasonically degas the solution, after which the beaker is placed on a magnetic stirrer, maintain a stirring speed of 400 r/min and stir evenly.

d. Use a burette, slowly drop the drug-containing solution fully emulsified in b into the sodium alginate solution, stir at a constant speed on a magnetic stirrer until fully mixed, and perform ultrasonic degassing again.

e. Take 20 milliliters of the mixed solution of step d in a beaker, add dropwise 1 mL of 5% calcium carbonate-water mixed solution, mix, and stir for 10 min (calcium carbonate suspension is added within 3 min).

f. Take another 100 mL of liquid paraffin in a grinding cup, add 10 mL of emulsifier A-110 into it, use a multi-purpose dispersing grinder to maintain a stirring speed of 1000 r/min, and pre-stir for 5 minutes.

g. After the liquid paraffin and emulsifier are mixed evenly, keep the speed of 1000 r/min unchanged, use a burette to add the mixed solution in step e evenly and slowly to the liquid paraffin, and continue to stir evenly for 10 minutes. (emulsification stage)

h. Keep the rotating speed of 1000 r/min unchanged, then take 20 mL of paraffin oil containing 87.5 mmol/L glacial acetic acid, and add it dropwise to the mixed solution in step g (addition is completed within 3 min), such that the mixed solution is fully cross-linked for 15 min. (cross-linking reaction stage)

i. After the reaction, use an acetate buffer solution pH 4.5 to fully wash the oil phase, use a separatory funnel to separate for obtaining a microcapsule slurry, and pack it in a 50 mL centrifuge tube.

j. Centrifuge the microcapsule slurry at −4° C. and 10,000 r/min at high speed for 15 minutes, pour off the supernatant, place it at 4° C. for 1 hour, then place it at −20° C. for 3 hours, and finally place the centrifuge tube in a vacuum freeze dryer for freeze drying at −50° C. for 42 h to obtain microcapsule powder, which is sealed and stored for backup.

1.3 Screening of microcapsule preparation conditions 1.3.1 Selection of capsule core solvent Pyraclostrobin is poorly soluble in water and is usually dissolved in organic solvents. Considering the safety in the production process, this study selected acetone, ethyl acetate, methanol, ethanol, and other organic solvents with moderate toxicity as capsule core solvents for dissolving the original drug. Through the preparation method of microcapsules adopted in this experiment, the particle size and distribution characteristics of the prepared microcapsules are considered, and the most suitable organic solvent is selected comprehensively.

1.3.2 Screening of adding amount of sodium alginate

The concentration of sodium alginate affects the appearance, encapsulation efficiency, drug loading, and release performance of the final microcapsules. In this experiment, 0.75%, 1%, 2%, and 3% sodium alginate is prepared into aqueous solutions as wall materials, and other pharmaceutical reagents of the same quality are added to it to prepare pyraclostrobin sodium alginate microcapsules respectively. The most suitable core-wall material ratio is screened out by measuring the particle size and particle size distribution of microcapsules prepared by different sodium alginates.

1.3.3 Screening of shear rate

The mixture of pyraclostrobin and sodium alginate is uniformly dispersed in the oil phase by high-speed shearing, thereby obtaining a uniform and stable emulsion, which affects the particle size and particle size distribution of the final microcapsules. In this experiment, the effect of shear rate on microcapsule granulation is investigated using the controlled univariate method by examining the particle size of pyraclostrobin microcapsules prepared at shear rates of 100, 500, 1000 and 1300 r/min and their particle size distribution range, so as to screen the shear rate at which the relatively smallest particle size microcapsules are prepared.

1.34 Screening of emulsification time

The length of emulsification time is an important factor affecting the final encapsulation effect of microcapsules. The emulsification time will have a great impact on the drug loading, encapsulation efficiency, thickness and strength of the capsule wall, and the appearance of microcapsules. In this study, the emulsification time of 5 min, 10 min, 20 min, and 30 min is set, and the effect of emulsification time on the particle size and distribution of pyraclostrobin SA microcapsules is studied, so as to screen out the most suitable emulsification time.

1.3.5 Screening of emulsifier type and dosage

The type and amount of emulsifier have a great influence on whether the microcapsules can form stable capsules and the overall effect after capsule formation. In this study, the emulsifying properties of three emulsifiers Span-80, Tween-80, and A-110 are evaluated. The common dosage range of emulsifiers is 2%-10%, so each emulsifier is set at 4%, and equal amounts of organic solvent, original drug, and water are added. The same stirring time and rate are fixed, and the emulsification effect of the three emulsifiers on pyraclostrobin is observed after stirring is completed, and the optimal emulsifier is selected according to the experimental results.

In terms of the screening of the amount of emulsifier, this experiment set the amount of emulsifier A-110 of 2%, 4%, 8%, 10% and 15% respectively, and the particle size and uniformity of distribution of the prepared pyraclostrobin SA microcapsules are used as the measurement criteria to screen the optimal amount of emulsifier addition under this experiment method.

1.4 Performance characterization of microcapsules 1.4.1 Appearance and morphology of microcapsules The appearance and morphology of the microcapsules are characterized by optical microscope and scanning electron microscope respectively.

1.4.2 FT-IR analysis and verification of microcapsules

Microcapsules, pyraclostrobin, and sodium alginate are analyzed by infrared spectroscopy using a Thermo Scientific Nicolet iN10 Fourier transform infrared spectrometer. The absorption peaks of the three characteristic functional groups are characterized by changing the infrared spectrum to observe the peak positions and peak changes of the absorption peaks.

1.4.3 Determination of particle size and distribution of microcapsules

BT-9300HT laser particle size distribution analyzer is applied to measure the particle size and distribution of the prepared microcapsule particles. The unit of microcapsule particle size is μm. Each group of samples to be measured is repeated three times, and D10, D50, D90, and Span of the microcapsules are determined. The relationship between the four may be expressed by equation (1).

$$Span=(D90-D10)/D50 \quad (1)$$

In the formula, Span represents the particle size distribution range of microcapsules, D90 represents the particle size with a cumulative particle distribution of 90%, D10 represents the particle size with a cumulative particle distribution of 10%, and D50 represents the particle size with a cumulative particle distribution of 50% and is also commonly used to indicate the average particle size of microcapsules.

1.4.4 Determination of encapsulation efficiency and drug loading of microcapsules The two most important indicators to measure the microcapsule encapsulation effect and encapsulation quality are the encapsulation efficiency and the drug loading. After the microcapsules sample to be experimented are treated, the absorbance of the sample at a fixed UV absorption peak is measured by UV-1900i UV spectrophotometer to calculate the encapsulation rate and drug loading.

$$\text{Encapsulation efficiency}(EE, \%) = \frac{\text{Amount of drug encasulated in microcapsules}}{\text{Total drug delivery}} \times 100\% \quad (2)$$

$$\text{Drug loading}(DLE, \%) = \frac{\text{Amount of drug encapsulated in microcapsules}}{\text{Total mass of microcapsules}} \times 100\% \quad (3)$$

1.4.5 Microcapsule stability determination

The cold storage stability, hot storage stability, and photostability are experimented respectively.

1.4.6 Determination of release performance of microcapsules

The experiment sets three different pH buffer media of pH 6, 7, and 8 to create release environments of weak acid, neutral, and weak base.

1.5 Results and analysis 1.5.1 Screening of capsule core solvents

In this study, starting from the toxicity of organic solvents, the dissolving ability of pyraclostrobin, and the uniform particle size and distribution of the prepared microcapsules, by comparing the experiment results of each group, a comprehensive investigation is conducted to select the best capsule core solvent suitable for this study.

TABLE 1

Parameters related to different organic solvents

| No. | Type of organic solvent | Solubility to original drug (25° C., g/100 mL) | Toxicity |
|---|---|---|---|
| 1 | Ethanol | ≥10 | Slight |
| 2 | Methanol | ≥10 | Moderate |
| 3 | Acetone | ≥65 | Low |
| 4 | Ethyl acetate | ≥65 | Low |

TABLE 2

Screening experiments of different organic solvents

| No. | Sodium alginate (%) | Pyraclostrobin (g) | Organic solvent (mL) | Emulsifier (%) | Type of organic solvent |
|---|---|---|---|---|---|
| 1 | 0.75 | 0.5 | 0.75 | 4 | Ethanol |
| 2 | 0.75 | 0.5 | 0.75 | 4 | Methanol |
| 3 | 0.75 | 0.5 | 0.75 | 4 | Acetone |
| 4 | 0.75 | 0.5 | 0.75 | 4 | Ethyl acetate |

According to the dosage ratio in Table 2, pyraclostrobin SA microcapsules are prepared. The particle size and particle size distribution of the microcapsules prepared under each group ratio are measured by a laser particle size distribution analyzer, and the results are shown in FIG. 2 and Table 3.

TABLE 3

Effects of different organic solvents on the average particle size and span of microcapsules

| No. | Average particle diameter D50(μm) | Span |
|---|---|---|
| 1 | 191.4 | 1.552 |
| 2 | 190.4 | 1.717 |
| 3 | 156.7 | 1.941 |
| 4 | 143.4 | 1.573 |

It can be seen from the particle size distribution diagram of the microcapsules that the particle size of the microcapsules prepared by the four organic solvents is: ethanol>methanol>acetone>ethyl acetate, and the particle size distribution span is: acetone>methanol>ethyl acetate>ethanol. Organic solvents that are poorly soluble in water and have relatively high solubility are often selected for the processing of pesticide formulations. The solubility of acetone and ethyl acetate to pyraclostrobin is much greater than that of methanol and ethanol at room temperature, but acetone is extremely volatile at room temperature, the particle size distribution of microcapsules prepared from acetone is not uniform, and the particle size curve does not conform to Normal distribution; combined with the particle size and distribution results of the microcapsules prepared in this experiment, the solubility of ethyl acetate to pyraclostrobin is relatively high, the distribution of the prepared microcapsules is relatively concentrated, and the particle size and the span of the microcapsules are relatively small. Considering the above factors, ethyl acetate is selected as the best solvent for this experiment for follow-up experiments.

1.5.2 Screening of adding amount of sodium alginate

Figure 3:
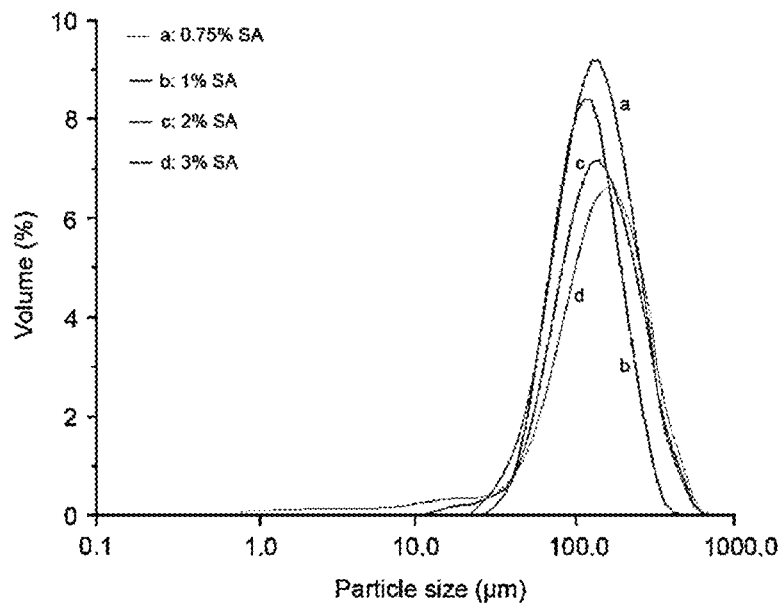
FIG. 3: Comparison of particle size distribution curves of microcapsules prepared with different concentrations of sodium alginate.

Sodium alginate is used as the microcapsule wall material in this study, and its aqueous solution has high viscosity, which will affect the finished properties of the microcapsules and the uniformity of drug dispersion. Therefore, it is necessary to screen the amount of sodium alginate added. As shown in Table 4, pyraclostrobin SA microcapsules are prepared by the controlled variable method. The particle size and distribution of the prepared microcapsules are measured by a laser particle size analyzer, and the results are shown in FIG. 3 and Table 4.

TABLE 4

Sodium alginate addition amount screening experiment

| No. | SA addition amount (%) | Original drug addition amount (%) | A-110 addition amount (%) | Shear rate (r/min) | Emulsification time (min) | Temperature (° C.) | n(Glacial acetic acid): n(Calcium carbonate) |
|---|---|---|---|---|---|---|---|
| 1 | 0.75 | 0.5 | 4 | 500 | 15 | 25 | 3.5 |
| 2 | 1 | 0.5 | 4 | 500 | 15 | 25 | 3.5 |
| 3 | 2 | 0.5 | 4 | 500 | 15 | 25 | 3.5 |
| 4 | 3 | 0.5 | 4 | 500 | 15 | 25 | 3.5 |

Figure 7A:
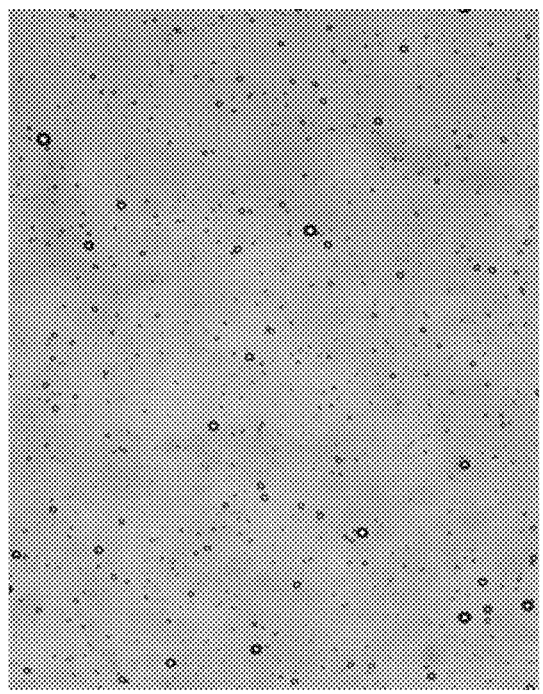
FIG. 7A: Morphological structure of pyraclostrobin SA microcapsules under an optical microscope of 100 magnifications.
Figure 7B:
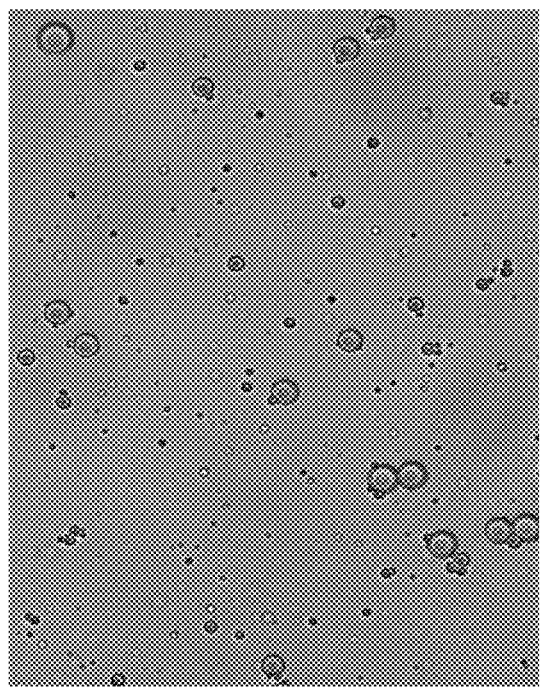
FIG. 7B: Morphological structure of pyraclostrobin SA microcapsules under an optical microscope of 400 magnifications.

The particle size and distribution of the microcapsules prepared by four concentrations of sodium alginate are measured by a laser particle size analyzer, and the results are shown in FIG. 7 and Table 7. FIG. 3 is a comparison chart of particle size distribution curves of microcapsules prepared with different concentrations of sodium alginate. It can be seen from the figure that when the concentration is 3%, the particle size of microcapsules is mainly concentrated between 40-500 μm, and comparing with the other two groups, it can be found that the particle size distribution is more dispersed at 3%; when the concentration is 0.75%, the particle size of microcapsules is mainly concentrated between 40-500 μm, and the overall particle size is moderate; and when the concentration is 1%, the particle size of microcapsules is mainly concentrated between 40-300 μm, and the overall particle size is smaller than the other two groups; when the concentration is 1%, the particle size of the microcapsules is mainly concentrated between 40-300 μm, and the overall particle size is smaller than the other two groups, and by analyzing the span of the particle size distribution of the four groups, it is found that the span is the smallest at concentration of 1%, and the span is 1.35.

TABLE 5

Characteristic values of particle size of microcapsules prepared with different concentrations of sodium alginate

| | Sodium alginate addition amount (%) | | | |
|---|---|---|---|---|
| | 0.75 | 1 | 2 | 3 |
| Average particle size (μm) | 143.4 | 123.5 | 152.9 | 160.1 |
| Span | 1.573 | 1.35 | 1.609 | 1.750 |

It can be seen from Table 5 that with the increase of the amount of sodium alginate added, the particle size of the microcapsules increases. When the concentration increases to 3%, the particle size of the microcapsules is the largest, and the average particle size reaches 160.1 μm. This is because as the amount of sodium alginate added increases, the viscosity of the solution becomes larger, and the solution with low viscosity is easy to disperse to form smaller droplets, thereby finally forming smaller microcapsule particles. A solution with a high viscosity will make it difficult to disperse, resulting in the formation of larger-sized droplets; in addition, when the viscosity of the solution is too high, it will be difficult to disperse pyraclostrobin in the solution, which causes inconvenience in the process and leads to different encapsulation rates of the final microcapsules, causing errors in the experiment results. At a concentration of 0.75%, the particle size of the prepared microcapsules is slightly larger than that at concentration of 1%. This is because the low concentration of sodium alginate will cause the microcapsules to be weak and easy to rupture, resulting in the increase of the microcapsule size.

Based on the above considerations, pyraclostrobin SA microcapsules prepared with sodium alginate at a concentration of 1% have the best effect, the smallest particle size, and a relatively concentrated particle size distribution. Therefore, 1% sodium alginate is chosen as a fixed parameter for subsequent experiments.

1.5.3 Screening of emulsification time

TABLE 6

Emulsification time screening experiment

| No. | SA addition amount (%) | Original drug addition amount (%) | A-110 addition amount (%) | Shear rate (r/min) | Emulsification time (min) | Temperature (° C.) | n(Glacial acetic acid): n(Calcium carbonate) |
|---|---|---|---|---|---|---|---|
| 1 | 1 | 0.5 | 4 | 500 | 5 | 25 | 3.5 |
| 2 | 1 | 0.5 | 4 | 500 | 10 | 25 | 3.5 |
| 3 | 1 | 0.5 | 4 | 500 | 20 | 25 | 3.5 |
| 4 | 1 | 0.5 | 4 | 500 | 30 | 25 | 3.5 |

The length of emulsification time will affect the final encapsulation effect of microcapsules and determine whether the emulsification process is sufficient, which will have a great impact on the drug loading, encapsulation efficiency, and thickness and strength of the capsule wall of the microcapsules. The pyraclostrobin SA microcapsules are prepared by the controlled variable method, and the experiment parameters are set as shown in Table 6 above.

TABLE 7

Characteristic values of particle size of microcapsules prepared with different emulsification time

| | Emulsification time (min) | | | |
|---|---|---|---|---|
| | 5 | 10 | 20 | 30 |
| Average particle size (μm) | 123.5 | 109.6 | 132.9 | 160.0 |
| Span | 1.35 | 1.891 | 1.966 | 1.751 |

Figure 4:
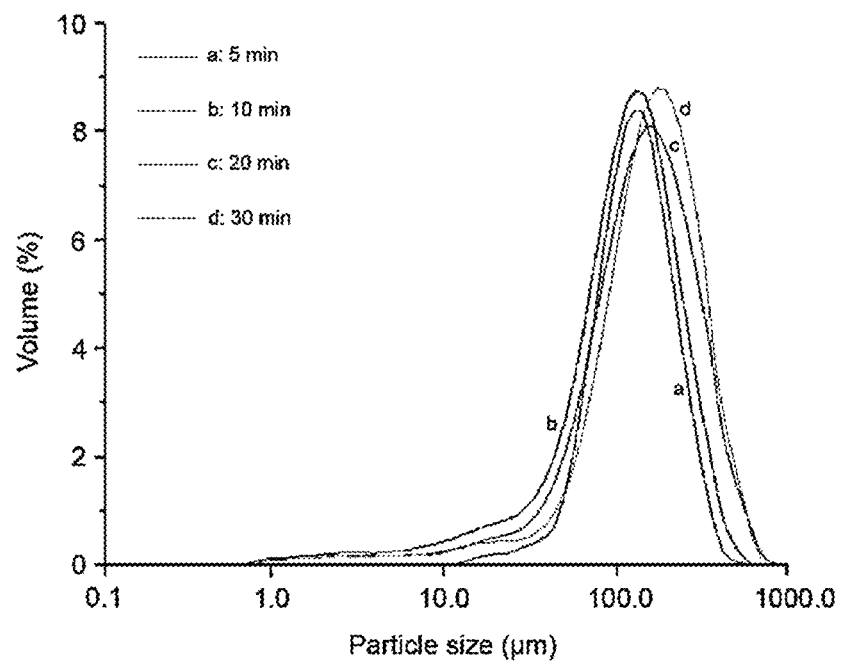
FIG. 4: Comparison of particle size distribution curves of microcapsules at different emulsification time.

FIG. 4 and Table 7 show the particle size and distribution of microcapsules at different emulsification time. It can be seen from the table that when the emulsification time is 5 minutes, the particle size of the microcapsules is slightly larger, and the average particle size is 123.5 μm. As the emulsification time increases, the particle size of the microcapsules becomes larger. When the emulsification time is 30 minutes, the particle size of the microcapsules is the largest, with an average particle size of 160.0 μm, the particle size of the microcapsules is mainly concentrated between 40-500 μm, and the span is 1.751, in which case the distribution of the microcapsules is relatively concentrated; when the emulsification time is 10 minutes, the particle size is the smallest with an average particle size of 109.6 μm, the distribution range is concentrated between 20-400 μm, the span is slightly larger, but the overall particle size is the smallest compared with other groups. Too long emulsification time will not only lead to the phenomenon of emulsion breakage but also cause energy waste, which does not meet the actual production requirements.

Based on the above considerations, the microcapsules prepared with an emulsification time of 10 min have the smallest particle size and a relatively concentrated distribution. Therefore, the emulsification time of 10 min is selected as a fixed parameter for subsequent experiments.

1.5.4 Determination of shear rate

Shearing is the process of forming large oil droplets into secondary oil droplets through shear force, which mainly affects the particle size and distribution of the microcapsules. The pyraclostrobin SA microcapsules are prepared by the control variable method, and the experimental parameters are set as shown in Table 8.

Figure 5:
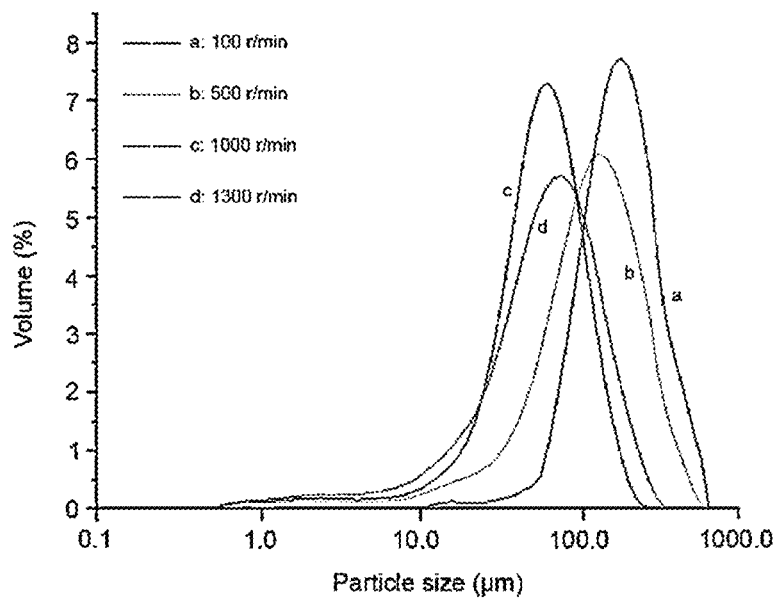
FIG. 5: Comparison of particle size distribution curves of microcapsules at different shear rates.

The particle size and distribution of the prepared microcapsules under different shear rates are measured by a laser particle size analyzer, and the results are shown in FIG. 5 and Table 8. The particle size of the microcapsules becomes smaller as the shear rate increases, but when the shear rate reaches 1300 r/min, the particle size of the microcapsules becomes slightly larger, with an average particle size of 74.51 μm.

TABLE 9

Characteristic values of particle size of microcapsules prepared at different shear rates

| | Shear rate (r/min) | | | |
|---|---|---|---|---|
| | 100 | 500 | 1000 | 1300 |
| Average particle size (μm) | 205.6 | 139.1 | 67.02 | 74.51 |
| Span | 1.500 | 1.950 | 1.647 | 2.114 |

Figure 9:
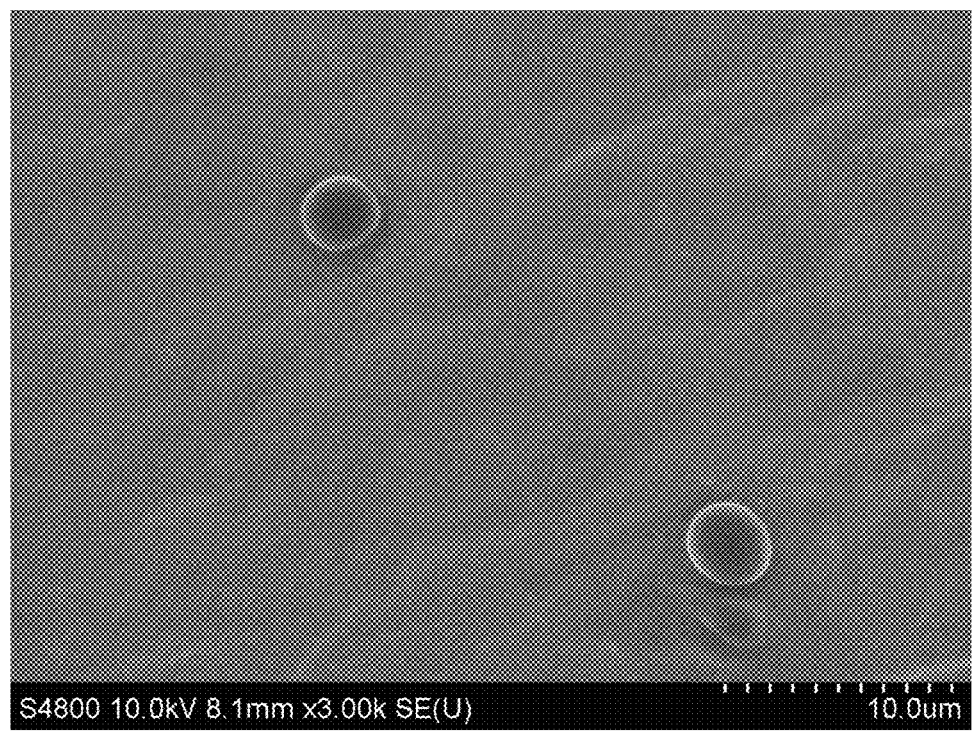
FIG. 9: Scanning electron micrograph of pyraclostrobin SA microcapsules (×3000).

Combining the tables in FIGS. 5 and 9, it can be found that the average particle size and span of the microcapsules decrease with the increase of the shear rate; when the shear rate is small, the solution cannot be stirred sufficiently, such that some of the large oil droplets cannot be converted into small oil droplets through the shear process, resulting in a larger particle size of the prepared microcapsules; when the shear rate is too high, the effect of the shear force on the average particle size brought about by the shear rate is weakened, and the too large stirring rate also leads to the generation of the phenomenon of emulsion breaking, resulting in a larger particle size of the microcapsules.

Based on the above considerations, when the shear rate is 1000 r/min, the pyraclostrobin SA microcapsules have the best effect, the smallest particle size, and the particle size distribution is relatively concentrated. Therefore, a shear rate of 1000 r/min is chosen as a fixed parameter for subsequent experiments.

1.5.5 Screening of emulsifier types and dosage 1.5.5.1 Screening of emulsifier types A suitable emulsifier is an important factor to prepare a uniform and stable emulsion and will also affect the encapsulation state of the microcapsules. In this study, after the mixed emulsions added with different emulsifiers are left to stand fully, the stability of the prepared emulsions is observed respectively, and the emulsification effects of the three on pyraclostrobin are compared by stability. The emulsification properties are shown in Table 10.

TABLE 8

Shear rate screening experiment

| No. | SA addition amount (%) | Original drug addition amount (%) | A-110 addition amount (%) | Shear rate (r/min) | Emulsification time (min) | Temperature (° C.) | n(Glacial acetic acid): n(Calcium carbonate) |
|---|---|---|---|---|---|---|---|
| 1 | 1 | 0.5 | 4 | 100 | 10 | 25 | 3.5 |
| 2 | 1 | 0.5 | 4 | 500 | 10 | 25 | 3.5 |
| 3 | 1 | 0.5 | 4 | 1000 | 10 | 25 | 3.5 |
| 4 | 1 | 0.5 | 4 | 1300 | 10 | 25 | 3.5 |

TABLE 10

Evaluation of the emulsification effect of different types of emulsifiers on pyraclostrobin

| Type of emulsifier | Emulsifier addition amount (g) | Sodium alginate (g) | Ethyl acetate (mL) | ddH$_2$O (g) | Evaluation of emulsification effect |
|---|---|---|---|---|---|
| Span-80 | 0.8 | 0.5 | 1.5 | 17.2 | Few precipitation |
| Tween-80 | 0.8 | 0.5 | 1.5 | 17.2 | With precipitation |
| A-110 | 0.8 | 0.5 | 1.5 | 17.2 | Even emulsion, no precipitation |

It can be seen from the above table that the emulsions prepared after adding emulsifiers Span-80 and Tween-80 all appeared precipitation after standing, which is caused by the instability of the formed emulsion state, while the emulsion prepared with the addition of emulsifier A-110 is homogeneous and without precipitation after standing, indicating that the stability of the prepared emulsion is good. Therefore, A-110 is selected as the emulsifier for this study for subsequent experiments.

1.5.5.2 Determination of emulsifier addition amount

The amount of emulsifier added has a great influence on whether the microcapsules can form stable capsules and the overall effect after capsule formation, so the choice of emulsifier is very important for the successful preparation of microcapsules. As shown in Table 11, pyraclostrobin SA microcapsules are prepared by the controlled variable method.

TABLE 11

Screening experiment of emulsifier addition amount

| No. | SA addition amount (%) | Original drug addition amount (%) | A-110 addition amount (%) | Shear rate (r/min) | Emulsification time (min) | Temperature (° C.) | n(Glacial acetic acid): n(Calcium carbonate) |
|---|---|---|---|---|---|---|---|
| 1 | 1 | 0.5 | 2 | 1000 | 10 | 25 | 3.5 |
| 2 | 1 | 0.5 | 4 | 1000 | 10 | 25 | 3.5 |
| 3 | 1 | 0.5 | 8 | 1000 | 10 | 25 | 3.5 |
| 4 | 1 | 0.5 | 10 | 1000 | 10 | 25 | 3.5 |
| 5 | 1 | 0.5 | 15 | 1000 | 10 | 25 | 3.5 |

Figure 6:
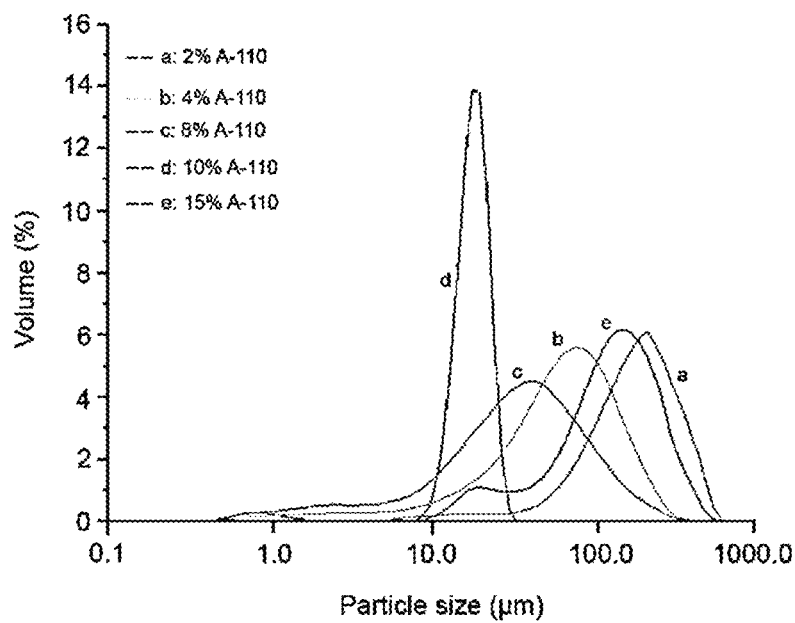
FIG. 6: Comparison of particle size distribution curves of microcapsules at different emulsifier concentrations.

The particle size and distribution of the prepared microcapsules are measured by a laser particle size analyzer, and the results are shown in Table 14 and FIG. 6.

TABLE 12

Characteristic value of particle size of microcapsules prepared by different emulsifier additions

| | Emulsifier addition amount | | | | |
|---|---|---|---|---|---|
| | 2% | 4% | 8% | 10% | 15% |
| Average particle size (μm) | 260.7 | 77.04 | 40.27 | 18.64 | 156.9 |
| Span | 1.756 | 2.141 | 2.944 | 1.355 | 1.940 |

It can be seen from FIG. 7 and Table 12 that when the amount of emulsifier A-110 is 2%, the particle size of the microcapsules prepared is the largest, with an average particle size of 260.7 μm, and the particle size of the microcapsules is mainly concentrated between 50-700 μm, which is because the emulsification of the mixed solution is insufficient in the state of low-concentration emulsifier, the particle size of the emulsion droplets in the emulsion is larger, such that the particle size of the microcapsules prepared after the cross-linking reaction is larger; overall, the particle size decreases with increasing emulsifier concentration, which is because adding emulsifier reduces the interfacial tension of emulsion, and emulsification effect becomes better thereupon, promoting the emulsion droplet deformation in emulsion and helping to form small size; however, when emulsifier addition is 15%, the particle size of the microcapsules becomes larger instead, with an average particle size of 156.9 μm, the particle size of the microcapsules is mainly concentrated between 10-30 μm, the span is 1.940, and the particle size of the microcapsules is mainly concentrated between 20-500 μm, this is because the emulsifier concentration is too high, resulting in the increase of the foam of the emulsion itself, viscosity increases, the phenomenon of polymerization of small droplets and coalescence to form large droplets, which makes the emulsification effect becomes worse. The microcapsules with 10% emulsifier have the best effect, with an average particle size of 18.64 μm and a span of 1.355, and the particle size of the microcapsules is mainly concentrated between 10-30 μm, with the most concentrated particle size distribution.

Based on the above considerations, when the emulsifier addition amount is 10%, the microcapsules prepared have the smallest particle size and the most concentrated distribution. Therefore, the emulsifier addition amount of 10% is selected as a fixed parameter for subsequent experiments.

The final formulation of pyraclostrobin SA microcapsules is shown in Table 15 below.

TABLE 13

Final formula of pyraclostrobin SA microcapsules

| Parameters | Ratio/amount |
|---|---|
| m(pyraclostrobin):m(SA) | 1:2 |
| m(SA):m(Calcium carbonate) | 3.9:1 |
| n(Glacial acetic acid): n(Calcium carbonate) | 3.5:1 |
| m(pyraclostrobin):m(Ethyl acetate) | 1:1.5 |
| v(oil phase): v(aqueous phase) | 6:1 |
| Emulsifier A-110 | 10% |
| Emulsification time | 10 min |
| Temperature | 25° C. |
| Shear rate | 1000 r/min |
| Acetate buffer solution | pH 4.5 |

Remarks: 1 mL is calculated as 1 g; the amount of emulsifier A-110 added and the emulsification time are all indicators of step f.

1.5.6 Appearance and morphology of pyraclostrobin SA microcapsules

It can be seen from FIG. 7 that the pyraclostrobin SA microcapsules form a spherical shape under an optical microscope, and the appearance of the microcapsules can be preliminarily observed through a 100-fold and 400-fold microscope. The overall shape of the microcapsules is round and spherical, with rounded spheres and smooth edges, and after dispersing with water to reduce the concentration, they can be distributed more evenly in water, indicating that the microcapsules can be better dispersed in water.

Figure 8:
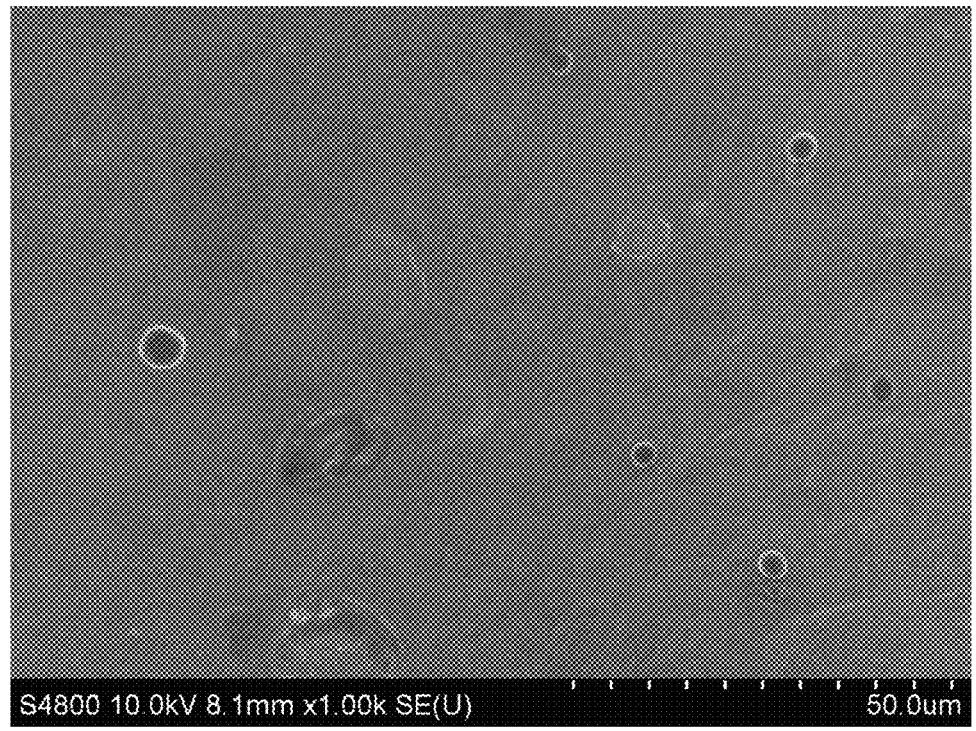
FIG. 8: Scanning electron micrograph of pyraclostrobin SA microcapsules (×1000).

FIGS. 8 and 9 show the appearance and morphology of pyraclostrobin SA microcapsules under a scanning electron microscope. The morphological characterization of the appearance of the microcapsules by high magnification microscope can be more clearly observed that the overall structure of the experimentally prepared microcapsules is rounded, the surface is smooth, no adhesion phenomenon occurs between them, the microcapsules can be uniformly dispersed, and the state of capsule formation is good.

1.5.7 Microcapsule particle size and distribution

Figure 10:
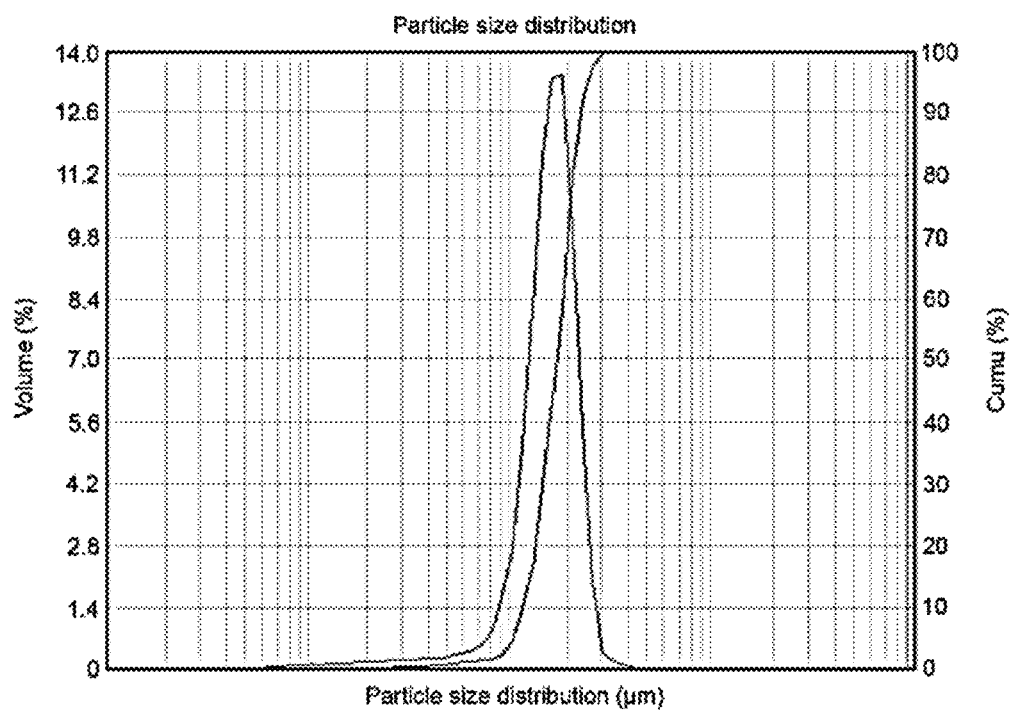
FIG. 10: Particle size distribution curve of pyraclostrobin SA microcapsules.

The particle size and distribution of the prepared microcapsule particles are measured by a BT-9300HT laser particle size distribution analyzer. It can be seen from the particle size distribution curve in FIG. 10 that the particle size of the microcapsules is mainly distributed between 10-30 μm, the overall particle size of microcapsules is normally distributed, and the particle size distribution is more uniform and concentrated, which indicates that the addition of emulsifier and the shear rate selected for the experiment are more suitable, and the microcapsules with uniform particle size distribution can be well prepared.

TABLE 14

Characteristic values of particle size of optimally formulated pyraclostrobin SA microcapsules

|  | D10 | D50 | D90 |
|---|---|---|---|
| Particle size | 11.43 | 17.78 | 22.03 |
| Span |  | 0.596 |  |

The Table 14 is the characteristic values of particle size of the pyraclostrobin SA microcapsules with the optimal ratio. The results show that the average particle size of the pyraclostrobin SA microcapsules prepared with the optimal ratio is 17.78 μm, and the span is 0.596. The smaller the particle size of the microcapsules, the denser the overall structure of the microcapsules will be, which reflects that the microcapsules formed by the endogenous emulsification method have good structure.

1.5.8 FT-IR Analysis and verification of microcapsules

In this experiment, Fourier transform infrared spectrometer is used to analyze the infrared spectrum of pyraclostrobin SA microcapsules, pyraclostrobin, and sodium alginate. Whether pyraclostrobin is successfully encapsulated by sodium alginate is determined by observing the positions of absorption peaks of characteristic functional groups of microcapsules, original drug, and sodium alginate and their changes.

Figure 11:
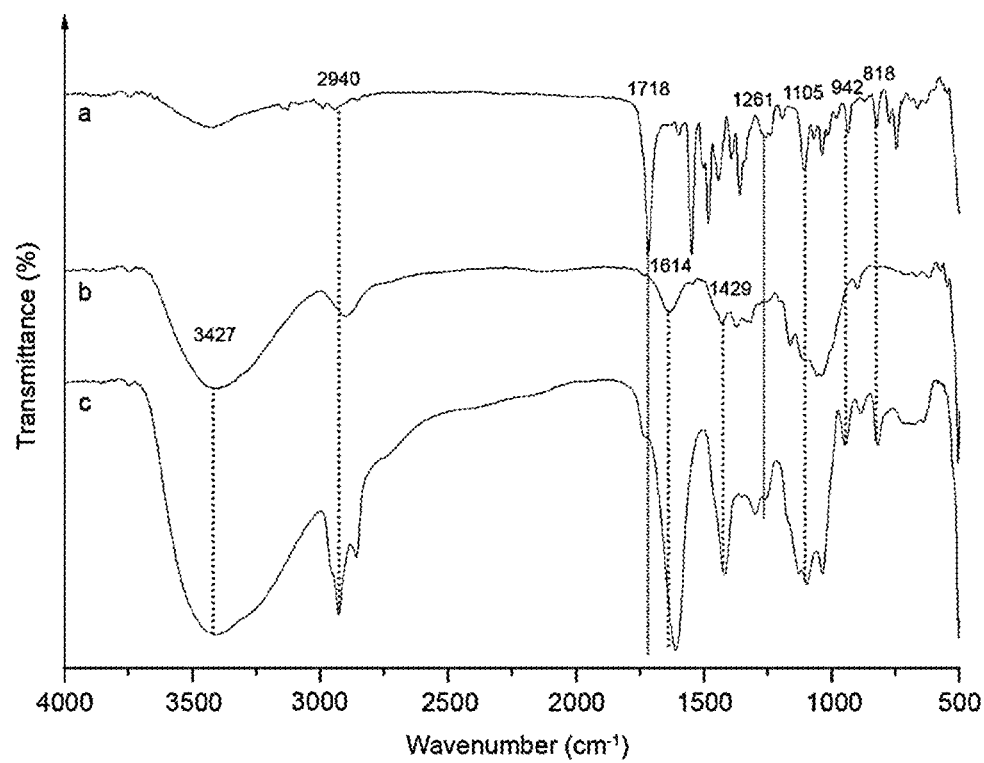
FIG. 11: Infrared absorption spectrogram of original drug, sodium alginate, and microcapsule.

Using a Thermo Scientific Nicolet iN10 Fourier transform infrared spectrometer to measure the characteristic absorption peaks of the three, the results are shown in FIG. 11: by comparing curves a and c, it can be clearly observed that pyraclostrobin original drug have strong absorption peaks of characteristic functional groups at several places, the strong absorption peak at 2940 cm$^{-1}$ is the C-H stretching vibration of methyl, the strong absorption peak at 1150 cm$^{-1}$ is the C-CL stretching vibration on the chlorobenzene ring, the strong absorption peak at 1150 cm$^{-1}$ is the stretching vibration of C-CL on the chlorobenzene ring, the –CH vibration on the pyrazole ring skeleton at 942 cm$^{-1}$, and the absorption band at 818 cm$^{-1}$ is the stretching vibration of C-N. By comparison, it can be found that these peaks also appear in the IR absorption spectrum of pyraclostrobin SA microcapsules, indicating that the measured microcapsules contain pyraclostrobin.

Comparing curves b and c, the infrared absorption spectrum of sodium alginate presents a peak stretched by hydroxyl (O-H) at 3427 cm$^{-1}$, peaks at 1614 cm$^{-1}$ and 1429 cm$^{-1}$ corresponded to symmetric/asymmetric stretching vibrations of the carboxyl group (—COO—), respectively, and these peaks appeared in the infrared absorption spectrum of the microcapsules indicate that the measured microcapsules contained sodium alginate.

It can also be observed in the figure that some of the characteristic peaks of microcapsules corresponding to pyraclostrobin and sodium alginate are affected by the addition of organic solvent and the interlacing phenomenon of mutual absorption occurring between sodium alginate and pyraclostrobin, being red-shifted and blue-shifted, and this phenomenon also indicates that the active ingredients of both pyraclostrobin and sodium alginate have fused with each other to form a whole. From the above analysis of the infrared absorption spectra of the three, the emulsification gel method can be used to make sodium alginate well encapsulate pyraclostrobin.

1.5.9 Determination of encapsulation efficiency and drug loading

Figure 12:
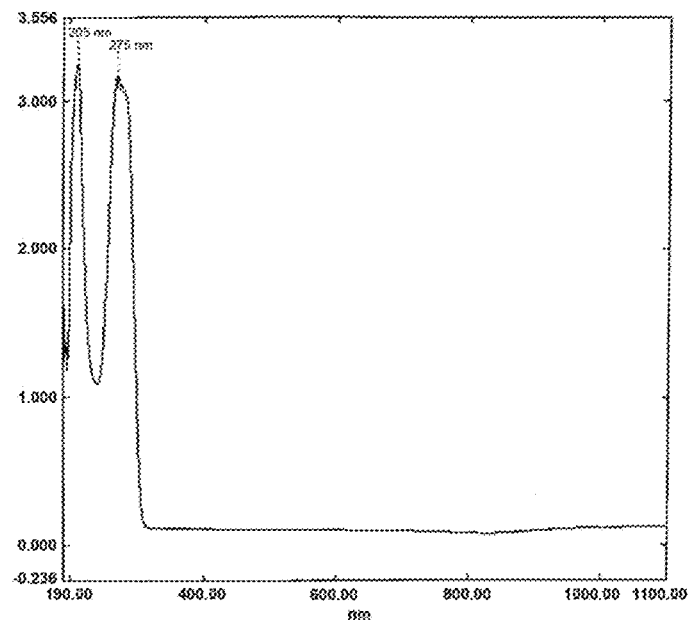
FIG. 12: Ultraviolet absorption spectrum of pyraclostrobin.

Scanning and measuring the ultraviolet-visible absorption spectrum of pyraclostrobin by UV-1900i ultraviolet spectrophotometer, it is determined that its maximum absorption peak is at 205 nm, that is, the maximum absorption wavelength is 205 nm, and its ultraviolet absorption spectrum is shown in FIG. 12.

Figure 13:
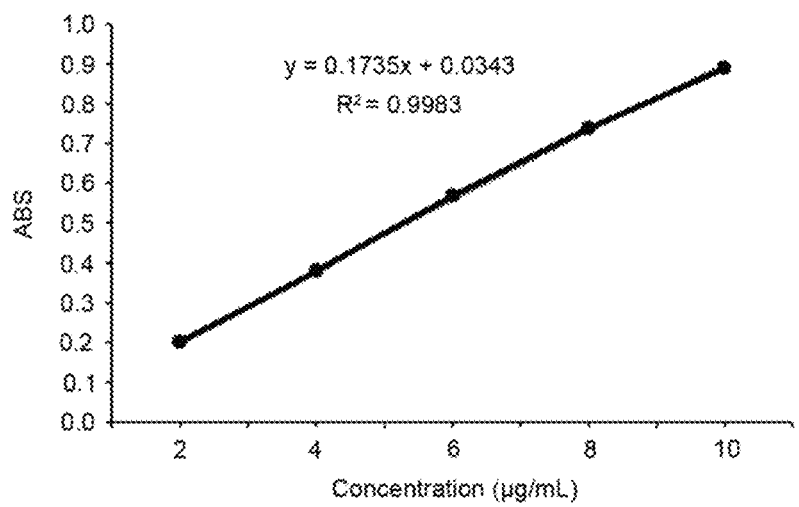
FIG. 13: Pyraclostrobin standard curve.

FIG. 13 is an established pyraclostrobin standard curve Y=0.1735X+0.0343, the results show that the correlation coefficient of pyraclostrobin in the concentration range of 2-10 μg/mL is 0.9983, indicating that the linear relationship is good and the standard curve can be used for determination and analysis of pyraclostrobin content. The encapsulation efficiency of pyraclostrobin SA microcapsules with the optimal ratio determined by the standard curve is 95.74%, the drug loading is 31.64%, indicating that the encapsulation effect is good.

1.5.10 Determination of stability of microcapsules

Determination of cold and heat storage stability of microcapsules

At 4° C. and −20° C., the decomposition rate of pyraclostrobin original drug and pyraclostrobin SA microcapsules is extremely low, and the stability is good; after storage at 25° C. for 30 days, the decomposition rate of the original drug is 2.2%, while the decomposition rate of the microcapsules is 1.87%, which is lower than that of the original drug; after the two are stored at a high temperature of 54° C. for 30 days, the decomposition rate of the active ingredients of the original drug is faster than that of the microcapsules, and the decomposition rate of the original drug is 40.25%, while the decomposition rate of the microcapsules is 16.44%, and the decomposition rate of the original drug is as high as more than half of that of the microcapsule. This is because the active ingredients in the low temperature state are not active and will not cause large decomposition of the original drug and microcapsules, indicating that both the original drug and the microcapsules are suitable for low-temperature storage; the decomposition rate of the microcapsules is lower than that of the original drug under high temperature conditions, indicating that pyraclostrobin SA microcapsules can delay and reduce the loss of active ingredients caused by high temperature to a certain extent, that is, improve the stability of the drug.

Determination of photostability of microcapsules

Determination of the active ingredient residual concentration of the original drug and microcapsules under the same ultraviolet light conditions, the results are shown in Table 15. It can be seen from Table 15 that the half-life of the original drug is 21.04 minutes, while the half-life of the microcapsules is 43.42 minutes, indicating that microencapsulation can prolong the half-life of active ingredients well.

TABLE 15

Photolysis dynamic equation of pyraclostrobin original drug and microcapsules

| Dosage form | Photolysis first-level kinetic equation | Rate constant | Half life | $R^2$ |
| --- | --- | --- | --- | --- |
| Original drug | $C_t = 9.986 \times e^{-kt}$ | 0.03 | 21.01 | 0.9871 |
| Microcapsules | $C_t = 9.547 \times e^{-kt}$ | 0.01 | 43.42 | 0.9874 |

Figures 14, 15:
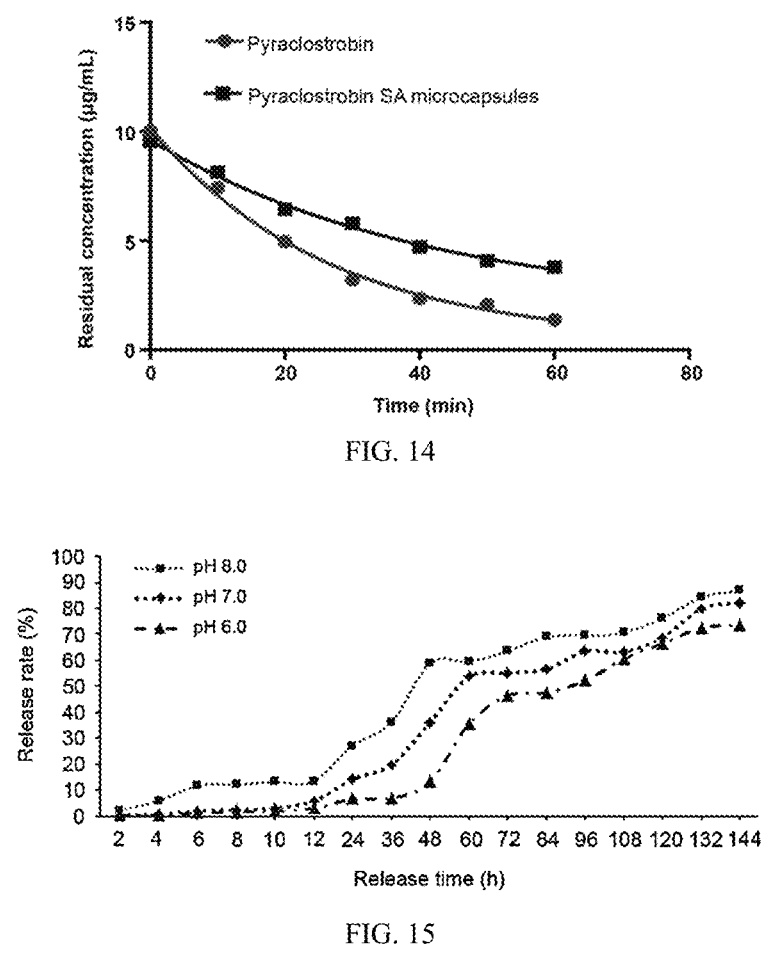

FIG. 14 is a photodegradation efficiency diagram of microcapsules and the original drug under ultraviolet light. It can be seen from the figure that the slope of the degradation rate curve of the original drug under ultraviolet light is relatively large, and the degradation rate is relatively fast. The degradation rate curve of the microcapsules is relatively gentle, and the degradation rate of the active ingredient is relatively slow. By comparing the decomposition rate of the two and the residual concentration of the active ingredient at the same time, it can be found that at the final time of 60 minutes, the residual concentration of the active ingredient in pyraclostrobin original drug is only 1.384 μg/mL, and the residual concentration of active ingredients in pyraclostrobin SA microcapsules is 3.778 μg/mL. This result shows that the pyraclostrobin SA microcapsules can reduce the photolysis rate and photolysis degree of the active ingredient by UV light to a certain extent to improve the stability of the agent, i.e., the microcapsules can increase the shelf life of the original drug when used in the field.

1.5.11 Determination of release performance of microcapsules

FIG. 15 shows the cumulative release curves of the active ingredient pyraclostrobin in the pyraclostrobin SA microcapsules in different pH release media. The active ingredient of the medicine inside the microcapsule is diffused and released outward through the pores of the capsule wall, and the speed of this release process is closely related to the size of the pores. Existing experimental studies have shown that SA microcapsules are pH-sensitive, and the —COOH group of sodium alginate microspheres dissociates in an alkaline environment, causing the swelling degree of the microcapsules in this environment to be higher than that in water. This makes the surface pore size of the SA microcapsules larger, and the release of the drug increases accordingly. While the SA microcapsules are converted from —COO— to —COOH in a weakly acidic environment, the degree of ionization and hydrophilicity are reduced, and the degree of swelling is low. The small surface pore size of the microcapsules significantly reduces the drug release in an acidic environment.

It can be seen from FIG. 15 that, in the release medium of each pH, the cumulative release rate of the active ingredients of the capsule core increases with time, and the microcapsules absorb water continuously at the beginning, and the particle size becomes larger. As time continues, the microcapsules expand, the surface pore size becomes larger, and the internal active ingredients are released continuously. Between 12 and 60 hours, the concentration difference of pyraclostrobin inside and outside the microcapsules is accumulated larger, resulting in an accelerated release rate of the active ingredients inside the capsule core to the outside. After 60 hours, the content of pyraclostrobin in the capsule core decreases continuously, which slows down the release rate of the microcapsules until the accumulated release amount tended to balance after 132 hours. The results show that the microcapsules are pH-sensitive, and in a weakly acidic environment, the swelling degree of the microcapsules is reduced and the surface pore size is reduced, such that the release amount of the drug is reduced.

Embodiment 2 Indoor toxicity determination

Experimented strain

The pathogen strain of Fusarium pseudograminearum used in this experiment is provided by the Plant Disease Epidemiology and Comprehensive Control Laboratory of the Plant Protection College of Anhui Agricultural University.

Indoor toxicity determination

By mycelium growth rate method, the fungicidal activity of pyraclostrobin original drug and the prepared pyraclostrobin SA microcapsules against Fusarium pseudograminearum is determined, and the release rule of the microcapsules in the culture medium is determined.

Preservation and use of Fusarium pseudograminearum.

Inclined experiment tube storage method: inoculate the strain of Fusarium pseudograminearum on a PDA plate for activation treatment, place the plate in a constant temperature incubator at 25° C. after sealing, and incubate for 3 days. Pick out the edge bacteria, transfer to a PDA slant experiment tube, and cultivate at a constant temperature at 25° C. until the colonies cover the surface of the slant, then put the experiment tube into a 4° C. refrigerator for storage until use.

Preparation of Potato Dextrose Agar (PDA) medium

Weigh 200 g of fresh peeled potatoes, wash and cut into small pieces, put 1 L of distilled water in the pot, put the potato pieces into it, cook until the potatoes can just be poked by the glass rod, turn off the heat, filter the solution into a big measuring cylinder using 8 layers of gauze, add 20 g of agar powder and 20 g of glucose to the filtrate, stir while hot until the agar powder and glucose melt, weigh 200 mL accurately into a triangular bottle using a small measuring cylinder, wrap the bottle tightly with two layers of gauze and eight layers of newspaper, put the triangular bottle into an autoclave, set the mode 121° C., sterilize for 20 min, then take it out and store it at room temperature for use.

Preparation of drug-containing PDA medium

The dried microencapsulated powder is prepared into mother liquor using sterile water, and then different amounts of mother liquor are aspirated and added the into potato dextrose agar (PDA) medium, and mixed with a magnetic stirrer to prepare a drug-containing medium with a mass concentration gradient of 0 µg/mL, 0.05 µg/mL, 1 µg/mL, 5 µg/mL, 10 µg/mL of the original drug agent, 3 replicates of each treatment; all drug-containing medium is poured at once; after the drug plate solidified, it is stored in a sealed 25° C. constant temperature incubator until use.

Inoculation treatment

Activate the Fusarium pseudograminearum on a drug-free PDA plate in advance, after culturing at 25° C. for 3 days, beat the fungus cake along the edge of the colony, pick the fungus cake with an inoculation needle every 0, 4, 8, 12, and 16 days and transfer it reversely to the center of the drug-containing medium; seal and store the culture dish, and place in a constant temperature incubator at 25° C. for cultivation. After each cultivation for 3 days, the diameter of the colony is measured by the cross method, and the average value is used to calculate the antibacterial rate as follows.

$$\text{Mycelium growth inhibition rate}(\%) = \frac{(\text{Blank group colony diameter} - \text{drug} - \text{containing group colony diameter})}{(\text{Blank group colony diameter})} \times 100\% \quad (8)$$

Toxicity determination

The concentration and inhibition rate are brought into SPSS software to calculate the inhibition effect of pyraclostrobin SA microcapsules on the mycelial growth of Fusarium pseudograminearum under different release conditions, to establish the toxicity regression equation (y=ax+b) of pyraclostrobin SA microcapsules against Fusarium pseudograminearum, and to obtain $EC_{50}$ values of microcapsules under different release times, and take photos to record the colony status each time.

Results and analysis

Figure 16:
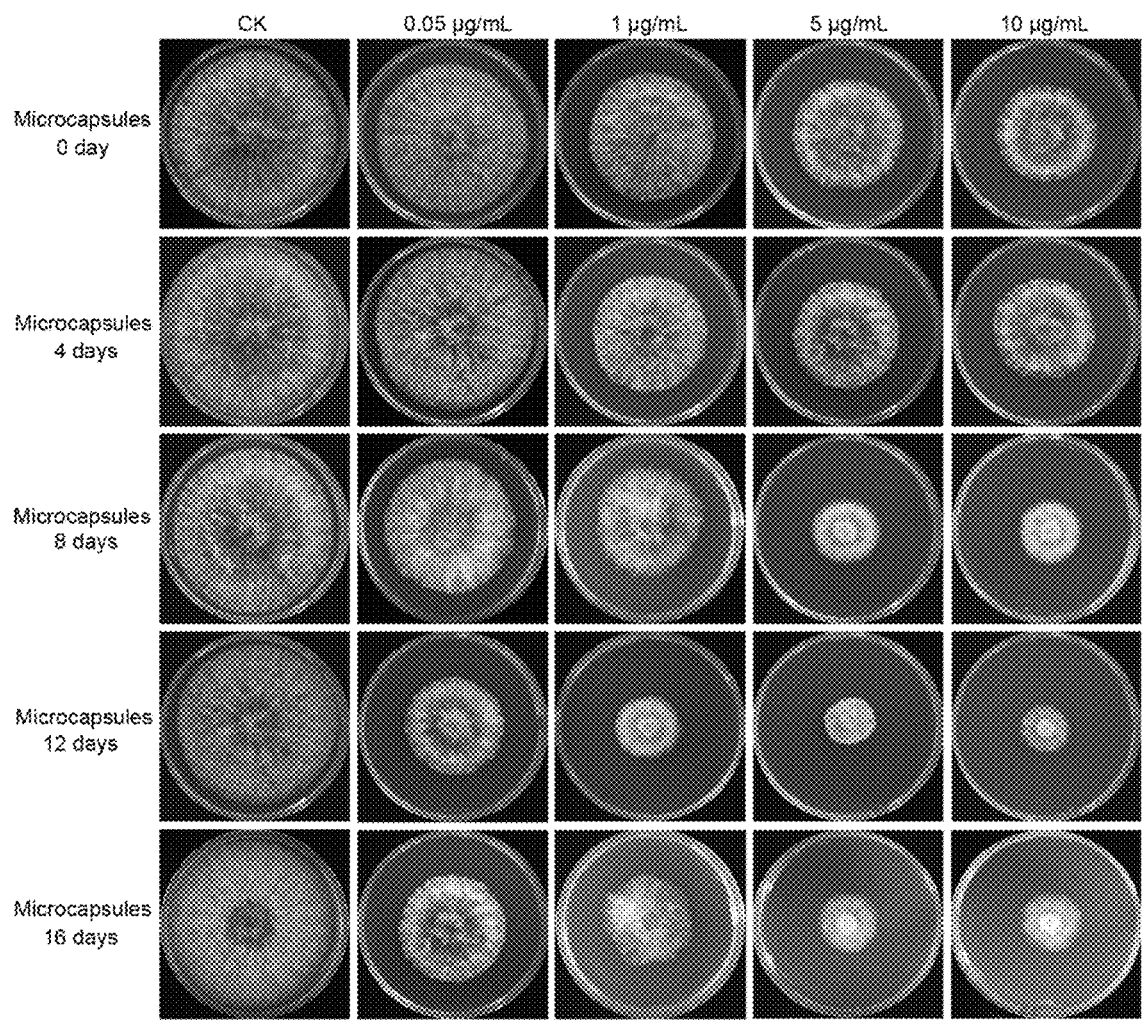
FIG. 16: Inhibition effect of microcapsule treatments with different release days on Fusarium pseudograminearum mycelium.

In this study, the mycelium growth rate method is used to measure the biological activity of the original drug and microcapsules. FIG. 16 shows the inhibition effect of microcapsules with different release days on the mycelium of Fusarium pseudograminearum. Table 16 shows the inhibition rate of pyraclostrobin SA microcapsules against Fusarium pseudograminearum at different release days. As shown in FIG. 16 and Table 16, the inhibition rate of pyraclostrobin SA microcapsules against mycelium of Fusarium pseudograminearum is significantly lower than that of the pyraclostrobin original drug. The $EC_{50}$ of pyraclostrobin SA microcapsules is 26.83 µg/mL when the fungus is inoculated at 0 days of treatment, while that of the original drug is 0.097 µg/mL. With the extension of time, the efficacy components in the microcapsules are released slowly, and the microcapsules gradually show their slow-release performance, mainly in the inhibition effect on mycelial growth is gradually strengthened, and the $EC_{50}$ at 16 d becomes slightly larger, which is caused by the weakened efficacy of the active ingredients released in the early stage.

Inhibition rate of pyraclostrobin SA microcapsules against Fusarium pseudograminearum.

| Mycelium inhibition rate (%) | Active ingredient concentration (ug/mL) | | | |
|---|---|---|---|---|
| | 0.05 | 1 | 5 | 10 |
| 0 d | 18.29 ± 0.55a | 28.94 ± 1.8b | 40.51 ± 0.28c | 45.37 ± 0.31d |
| 4 d | 19.41 ± 2.51a | 34.93 ± 0.98a | 45.43 ± 0.28b | 46.58 ± 0.33c |
| 8 d | 23.99 ± 1.0492a | 43.71 ± 0.74b | 45.61 ± 1.58b | 62 ± 1.42c |
| 12 d | 44.57 ± 1.35a | 64.2 ± 1.06a | 75.75 ± 0.36b | 77.14 ± 0.53c |
| 16 d | 43.29 ± 0.18a | 62.96 ± 1.75a | 67.13 ± 0.41b | 68.06 ± 0.09c |

Figure 17:
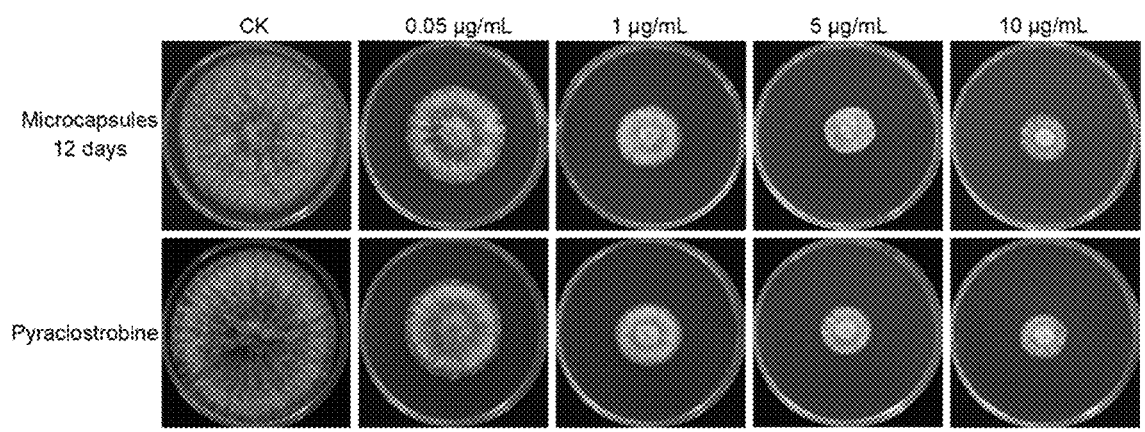
FIG. 17: Comparison of the inhibition effects of microcapsules 12d and the original drug on Fusarium pseudograminearum mycelium.

FIG. 17 is a comparison of the inhibition effects of pyraclostrobin original drug and pyraclostrobin SA microcapsules after release of 12 days on Fusarium pseudograminearum. Table 17 shows $EC_{50}$ determination results of the original drug and pyraclostrobin SA microcapsules with 5 different release days against Fusarium pseudograminearum. FIG. 17 and Table 17 show that the inhibition effect on mycelium growth reaches the maximum when the microcapsule release days is 12 days, and the inhibition effect is close to that of the original drug. According to the inhibition rate, the virulence regression equation, $EC_{50}$, 95% confidence interval and correlation coefficient are calculated by SPSS software. The $EC_{50}$ of the microcapsules is 0.1109 μg/mL at 12 days, which is close to the $EC_{50}$ value of the original drug. Therefore, considering comprehensively, pyraclostrobin SA microcapsules have the best effect when treated for 12 days, and can achieve the greatest inhibition effect on mycelium growth.

TABLE 17

Results of EC50 determination of microcapsules and original drug against Fusarium pseudograminearum

| Strain name | Type of drugs | Regression equation | $EC_{50}$ | 95% confidence interval | $R^2$ |
|---|---|---|---|---|---|
| Fusarium pseudograminearum | Original drug | y = 0.3771x + 5.38 | 0.097 | 0.0802-0.1174 | 0.9991 |
| | Microcapsules processed on $0^{th}$ day | y = 0.3416x + 4.51 | 26.8316 | 13.7653-52.300 | 0.9915 |
| | Microcapsules processed on $4^{th}$ day | y = 0.3504x + 4.60 | 13.6297 | 9.2164-20.1563 | 0.9960 |
| | Microcapsules processed on $8^{th}$ day | y = 0.3865x + 4.79 | 3.4091 | 1.2417-9.3597 | 0.9522 |
| | Microcapsules processed on $12^{th}$ day | y = 0.3957x + 5.37 | 0.1109 | 0.0786-0.1566 | 0.9969 |
| | Microcapsules processed on $16^{th}$ day | y = 0.2840x + 5.24 | 0.1424 | 0.0562-0.3610 | 0.9756 |

Figure 18:
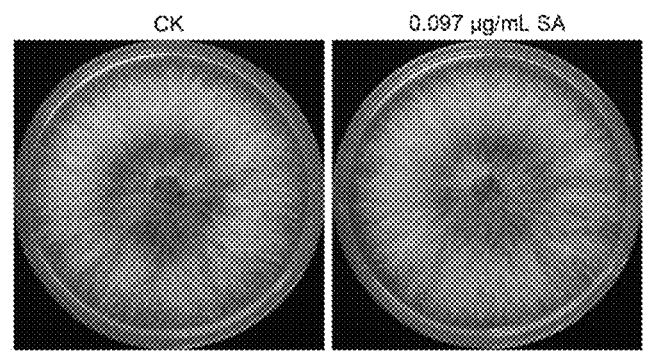
FIG. 18: Inhibition effect of sodium alginate on Fusarium pseudograminearum mycelium.

In order to exclude the inhibition effect of sodium alginate on Fusarium pseudograminearum, the experiment set up a sodium alginate treatment group and a distilled water blank control group. FIG. 18 shows the mycelium growth in the treatment group and the control group, both after 3 days of colony inoculation. From the figure, it can be seen that the mycelium growth of Fusarium pseudograminearum in the sodium alginate treatment group is close to the same as that of the distilled water blank control group within the same time, and there is no significant difference in colony morphology, thus the effect of sodium alginate on wheat root rot bacteria can be excluded.

The above is only preferred embodiments of the present disclosure, and those skilled in the art can make appropriate improvements without departing from the raw materials of the present disclosure, and these improvements are also within the scope of the present disclosure.

What is claimed is:
1. A method for preparing a pyraclostrobin microcapsule based on sodium alginate, comprising:
a) accurately weighing pyraclostrobin original drug into a beaker, adding ethyl acetate to the beaker, placing the beaker on a magnetic stirrer and stirring until the original drug is completely dissolved;
b) adding an emulsifier and ddH$_2$O dropwise into the beaker, keeping the stirring speed of 400 r/min to obtain a drug-containing solution, and emulsifying evenly for 10-20 minutes; wherein a mass ratio of the emulsifier to ddH$_2$O is 1:9-11;
c) weighing sodium alginate to a beaker, adding ddH$_2$O, and placing the beaker in a water bath at 60° C.; keeping stirring at a constant temperature until the sodium alginate is completely dissolved and fixing volume with ddH$_2$O to obtain a solution, ultrasonically degassing the solution with an ultrasonic cleaning machine, placing the beaker on a magnetic stirrer, and keeping the stirring speed of 400 r/min and stirring to obtain a sodium alginate solution; wherein the sodium alginate solution is 1% by mass concentration, wherein the emulsifier emulsifies the ethyl acetate and the sodium alginate to generate a homogeneous emulsion without precipitation;
d) slowly dropping the drug-containing solution fully emulsified in the step b into the sodium alginate solution with a burette, stirring at a constant speed on a magnetic stirrer until fully mixed, and performing ultrasonic degassing again to obtain a mixed solution;
e) taking the mixed solution in the step d in a beaker, adding dropwise 5% calcium carbonate-water mixed solution, and mixing and stirring to obtain another mixed solution; wherein the calcium carbonate-water mixed solution is added dropwise within 3 minutes;
f) taking liquid paraffin in a grinding cup, adding the emulsifier into the grinding cup, and keeping the stirring speed of 1000 r/min and pre-stirring for 5 minutes with a multi-purpose dispersing grinder;
g) emulsification stage: after the liquid paraffin and emulsifier are mixed evenly, keeping the stirring speed of 1000 r/min, adding the mixed solution in the step e evenly and slowly to the liquid paraffin with a burette, and continuing to stir evenly for 10 minutes to obtain further another mixed solution;
h) cross-linking reaction stage: keeping the stirring speed of 1000 r/min, taking paraffin oil containing 87.5 mmol/L glacial acetic acid and adding dropwise to the mixed solution in the step g, such that the mixed solution is fully cross-linked;

i) after the cross-linking reaction is completed, fully washing an oil phase with an acetate buffer solution pH 4.5, separating for obtaining a microcapsule slurry with a separatory funnel, and pack the microcapsule slurry in a centrifuge tube; and
j) centrifuging the microcapsule slurry at −4° C. and 10,000 r/min for 15 minutes, pouring off supernatant, placing the centrifuge tube at 4° C. for 1 hour and at −20° C. for 3 hours, placing the centrifuge tube in a vacuum freeze dryer for freeze drying at −50° C. for 42 hours to obtain microcapsule powder, and sealing and storing the microcapsule powder for backup;

wherein, a mass ratio of the pyraclostrobin to the ethyl acetate is 1:1.5;

a mass ratio of the pyraclostrobin to the sodium alginate is 1:2;

a mass ratio of the sodium alginate to the calcium carbonate is 3.9:1;

a molar ratio of the glacial acetic acid and the calcium carbonate is 3.5:1;

in the step f, a mass ratio of the liquid paraffin to the emulsifier is 9:1; and a volume ratio of the oil phase to an aqueous phase is 6:1.

* * * * *